United States Patent [19]

Kiefer

[11] 4,172,921
[45] * Oct. 30, 1979

[54] FIREPROOF GLASS

[75] Inventor: Werner Kiefer, Mainz, Fed. Rep. of Germany

[73] Assignee: Jenaer Glaswerk Schott & Gen., Mainz, Fed. Rep. of Germany

[*] Notice: The portion of the term of this patent subsequent to Oct. 5, 1993, has been disclaimed.

[21] Appl. No.: 845,987

[22] Filed: Oct. 27, 1977

Related U.S. Application Data

[63] Continuation of Ser. No. 577,481, May 14, 1975, abandoned.

[30] Foreign Application Priority Data

May 17, 1974 [DE] Fed. Rep. of Germany ....... 2424172

[51] Int. Cl.² .................... B32B 17/00; C03B 32/00
[52] U.S. Cl. ..................... 428/410; 52/171; 65/33; 428/920
[58] Field of Search ................. 65/33, 65 R, 104, 114, 65/115; 106/47 R, 52, 54; 52/171; 428/410, 426, 428, 920

[56] References Cited

U.S. PATENT DOCUMENTS

| | | | |
|---|---|---|---|
| 3,107,196 | 10/1953 | Acloque | 65/115 X |
| 3,282,770 | 11/1966 | Stookey et al. | 428/410 |
| 3,673,049 | 6/1972 | Giffen et al. | 428/213 |
| 3,778,338 | 12/1973 | Murphy et al. | 428/428 X |
| 3,779,856 | 12/1973 | Pirooz | 428/410 X |
| 3,907,577 | 9/1975 | Kiefer et al. | 106/39.7 |
| 3,931,438 | 1/1976 | Beall et al. | 428/218 |
| 3,984,252 | 10/1976 | Kiefer | 106/54 |

FOREIGN PATENT DOCUMENTS 739427 10/1955 United Kingdom.

Primary Examiner—P. E. Willis, Jr.
Attorney, Agent, or Firm—Sprung, Felfe, Horn, Lynch & Kramer

[57] ABSTRACT

Fireproof glass, in a form suitable for use as windowpanes, which will withstand heating in accordance with DIN (German Industrial Norm) 4102 (1970 edition), standard temperature curve I, and having a compressive prestress in the peripheral portion thereof. The glass, is such that the product of the thermal expansion coefficient, $\alpha$, and the modulus of elasticity, E, is 1 to 5 $kp \times cm^{-2} \times °C.^{-1}$, and which tend to surface crystallization.

8 Claims, 3 Drawing Figures

FIRE-RESISTANT GLASS PANE WITH FRAME.
COMPRESSIVE STRESS IN MARGINAL ZONE OF THE GLASS PANE.

COMPRESSIVE STRESS IN MARGINAL ZONE OF THE GLASS PANE AND IN THE SURFACE LAYER OF THE CENTRAL PORTION OF PANE

FIREPROOF GLASS

This is a continuation of application Ser. No. 577,481, filed May 14, 1975 now abandoned.

This application is an improvement in the invention disclosed in my copending Ser. No. 505,895, filed Sept. 13, 1974 and now U.S. Pat. No. 3,984,252, which is incorporated herein by reference.

BACKGROUND

This invention relates to fire-proof glass sheets or panes which resist high temperature, and which have such a high thermal strength and dimensional stability that when they are used as a room closure, they withstand a fire test according to DIN 4102 for at least 90 minutes without cracking or causing an opening in the room closure.

It is generally known that in the event of a fire in a building, the glazing in windows, doors and partitions are cracked by the heat which is set up and the broken pieces fall out of the frames. The cracking and falling out of the glazing in the event of a fire is very dangerous for two reasons: firstly, the pieces which fall out can lead to serious injury, and secondly the fire is able to spread from room to room inside the building through the openings which are thereby formed and also from floor to floor over the external wall. Several fires in high buildings have shown what disasters can be the result thereof.

The only glases which are resistant to fire in accordance with DIN 4102 and which have been used for the glazing of buildings are wired or armoured glass and the glass bricks.

However, wired glass and glass bricks are unsuitable for many fields of application. Thus, wired glass cannot be used for optical reasons, for example, as window glazing for residential use. The wire mesh in the wired glass has hitherto always proved to be very disadvantageous, when it was a question of using the glazed opening as a way of escape or as a room closure. Glass bricks can only be used for special purposes because of their high weight and their greatly reduced transparency.

As compared with the normal commerical glass used in buildings, plate glass or float glass, which are very similar as regards their heat expansion, the thermally hardened building glass not only has an increased mechanical strength, but also an increased thermal resistance. Accordingly, these thermally hardened glasses are also used in the parapet zone, in which there can be temperature differences of 100° to 120° C.

Using a fire test according to DIN 4102 (1970 Edition), sheet 2, section 5.2.4 (FIG. 1, curve 1) the single glasses and the thermally hardened glasses consisting of building glass, plate glass or float glass, already crack after 2 to 3 minutes, and consequently the standard as regards fire and the spreading thereof is no longer satisfied. It is true that the wired glass and the glass bricks also crack after 2 to 3 minutes, but as regards these glasses, the cohesion is assured by the wire meshing or by the width of the glass bricks, and fire and smoke are prevented from passing through for at least 60 minutes.

However, if a fire lasts longer than 60 minutes, then the temperature in the glazing enclosing the fire area rises to above the softening temperature of these glasses, so that the glazing is deformed and a passage is made available for the fire and smoke.

It was found that, in a fire test according to DIN 4102, the temperature of a single glazing having a thickness of 7 mm already rises to about 700° C. in a period of 60 minutes on the side further from the fire. With fires lasting a longer time, the temperature of the glass pane rises to above 700° C., so that the softening temperature ($10^{7.6}$ poises) of the glass is finally reached and exceeded. At latest on reaching the softening temperature of the glass, however, the glass pane is so strongly deformed that it no longer prevents fire and smoke passing through.

In many cases, however, it is necessary for the glazing in external wall openings, partitions and doors, to withstand a fire for longer than 60 minutes.

Tests have shown that, after 90, 120 and 180 minutes, respectively, in a fire test according to DIN 4102, temperatures of about 800°, 850° and 900° C., respectively, occur on the single glazing which is further from the fire and which is enclosing the seat of the fire.

THE INVENTION

The object of the present invention is to provide sheets or panes which have such a high thermal strength and dimensional stability that, when they are used as glazing in a room closure, they withstand a fire test according to DIN 4102 (1970), sheet 2, section 5.2.4 (FIG. 1, curve 1) for at least 90 minutes without cracking on being heated or providing a passage to the fire or smoke.

It has now been found that this object is achieved with glass panes which are characterised in that they have a compressive stress in the marginal region and consist of glasses of which the product of heat expansion ($\alpha$) and elasticity modulus (E) amounts to 1 to 5 [$kp \times cm^{-2} \times °C.^{-1}$], and which are capable of surface crystallisation.

For the fire test according to DIN 4102, the panes with frames have to be installed as a room or space closure into a fired furnace. With the rapid heating in accordance with the standard temperature curve 1, (STC1), sheet 2, section 5.2.4., a temperature gradient is set up between the centre of the pane and the rim or margin thereof, because the said rim is initially heated up more slowly than the centre of the pane, because of the heat-insulating action of the frame. Due to this temperature gradient or drop, a tensile stress is set up in the marginal zone; and this can lead to the destruction of the pane. The height of the temperature gradient is, inter alia, dependent on the heating-up speed, the heat insulation of the rim or margin of the pane by the frame and the width of the frame. With a frame which is 2–3 cm wide, the temperature difference is generally between 200° and 300° C. With a wider frame, the temperature difference can be even higher. However, since the stresses are reduced again above the transformation temperature (Tg), the temperature difference which leads to the tensile stresses cannot be greater than Tg, i.e. about 550° C. for borosilicate glasses. Since a frame at least about 2 cm wide is generally required for holding the panes, the stressed glass panes must have such a high thermal strength that they withstand a temperature drop between the hotter central portion of the pane and the colder rim of the pane of about $\geq 200°$ $\leq 550°$ C., without cracking.

The fire-proof and high temperature-resistant glass panes according to the invention are those which have a compressive stress in the marginal region, or in the marginal region and in the surface layer of the centre of the pane, and which consist of glasses of which the product of $\alpha \times E$ is 1 to 5 [kp$\times$cm$^{-2}\times$°C.$^{-1}$]. and which have such a strong tendency to surface crystallisation that they form an at least 5 μm preferably at least 10 μm thick, continuous crystalline surface layer on being heated in accordance with the STC1.

Because the panes have a compressive stress in the marginal zone and the product $\alpha \times E$ of the glasses of which the glass panes consist is between 1 and 5 [kp$\times$cm$^{-2}\times$°C.$^{-1}$] the glass panes withstand a temperature difference between colder pane rim and hotter pane centre of 200° to about 500° C., without cracking.

The higher the compressive stress in the pane rim or margin of such glass panes, the higher is their resistivity to temporary stresses, which are established with the rapid heating up between pane centre and the pane rim gripped by a frame.

It has been found that the height of the compressive stress which may be present in the pane rim is limited by the tensile stress which is simulateneously set up in the pane centre as a reaction stress.

As regards glasses, a stength of 200 to 300 kp/cm² is generally expected. So that also the glass panes with a compressive stress in the marginal region and a tensile stress in the middle region also withstand a loading, as for example wind pressure, the strength in the middle region must not be too greatly reduced.

The maximum tensile stress which can be permitted in practical use in the surface of the panes should therefore generally not exceed approximately 80 to 100 kp/cm², since otherwise the mechanical strength is too greatly reduced. Due to the compressive stress existing in the marginal region of the glass panes, the mechanical strength of the panes ought accordingly be reduced at most by an amount of about 80 to 100 kp/cm². Glass panes which have a compressive stress in both the marginal region and in the surface of the centre of the panes generally also show an increased mechanical strength.

A series of processes is known in the literature which have for their object to produce high-strength glass objects with crystalline surface layers. All these processes start from basic glasses which, with a controlled heat treatment, either spontaneously crystallise on the surface, or which form a crystalline surface layer in association with an ion exchange. With the surface crystallisation, the crystals grow in parallel relation into the interior of the glass, starting from the surface. As a result, depending on the thickness of the crystalline surface layer, the surface-crystallised glass objects are given a more or less strongly translucent appearance. All the processes described in the patent literature start from basic glasses which contain Li$_2$O, Al$_2$O$_3$ and SiO$_2$, and which form in the surface a partially crystalline layer of h-quartz solid solution with the heat treatment, directly or after an ion exchange. With all processes, the partially crystalline layer has a lower heat expansion than the interior of the glass. With the cooling of the surface-crystallised glass objects, a compressive stress is established in the surface layer, because of the low heat expansion of this layer in relation to the glass interior. The compressive stress in the surface layer imparts to the objects an increased mechanical strength and resistance to temperature change. The crystalline surface layer which is produced is generally 30 to 100 μm thick, in order to withstand normal wear. The known glass objects with crystalline surface layers which are 30 to 100 μm thick have however the disadvantage that, depending on the thickness of the crystalline layer, they have a strongly clouded appearance.

By contrast with the known glass objects having crystalline surface layers, the glass sheets or panes which are claimed do not initially have a crystalline surface layer, or at most such a layer which is only a few μm, about 2 to 5 μm, thick.

The glass panes according to the invention advantageously consist of glasses of which the tendency to surface crystallisation is so great that, during the time in which a fire space is heated up in accordance with the standard temperature curve I, a continuous crystalline surface layer at least preferably at least 10 μm, thick is formed on the glass pane closing the said space, said surface layer having an upper devitrication limit of higher than 800° C.

Glasses to adequate tendency of surface cyrstallisation according to the present invention are glasses which will have developed a crystalline or partly crystalline surface layer of at least 5 μm thickness on reaching the softening point (750°–800° C. for preferred glasses) of the basic glass, when heating up along the standard temperature curve (STC1 FIG. 1). The term surface crystallization means, that crystallization starts from the surface of the glass and grows towards the interior of the glass pane. If the glass panes are exposed to the heat for a period exceeding that to reach the the softening point of the basic glass, crystallization may proceed further to the interior of the glass pane without deviating from the scope of the invention.

Good information concerning the crystallisation behaviour of glass is provided by differential thermoanalysis (DTA). By this analysis, it is possible readily to decide whether a glass easily crystallises and, if so, whether it tends to volume crystallisation or surface crystallisation. For establishing the latter, glass specimens of different grain sizes are heated to high temperature by the same temperature programme. If the glass tends to volume crystallisation, then the exothermic peaks in the crystallisation are all at the same temperature.

On the other hand, if the glass shows a surface crystallisation, then the exothermic peak of the fine granulation is at a lower temperature than that of the coarse granulation.

Experiments have surprisingly shown that already a crystal layer which is a few μm thick but is continuous imparts a greatly increased stability to the glass body. It was additionally found that, in order to produce particularly good results, the tendency of the glasses to surface crystallisation should be so great that, during the heating-up process in accordance with the standard temperature curve I (DIN 4102), a crystalline surface layer about 5 to 10 μm thick is formed just before the softening temperature is reached. In order to be able to determine whether the tendency of the glass to surface crystallisation is sufficient, the crystal growth speed at the softening temperature, the activation energy of the crystal growth speed in the temperature range between the transformation temperature and the softening temperature and the heating-up speed of the glass in the fire test according to DIN 4102 must be known.

Other tests have shown that the heating-up speed of the glass pane in accordance with STC1 is about 3° C./min between the 30th minute and the 90th minute.

With glasses strongly crystallising on the surface, the softening temperature cannot be directly measured. In these cases, the softening temperature of the basic glass must be calculated. For calculating the activation energy of the crystal growth speed in accordance with the Arrhenius equation, the crystal growth speed is best determined at the softening temperture and at a lower temperature. Using the DTA, the temperature for a fixed crystal growth speed can be established. With a heating-up speed of 3° C./min and a grain size of 40 to 60 μm, the glass has a crystal growth speed of 1.5 μm/min at the DTA peak temperature. The thickness (D) of the crystalline surface layer, which occurs at the softening temperature in the fire test, can be calculated in accordance with the following equation:

$$D_{EW} = KG_{EW} \times \frac{RT_{EW}^2}{a \times A} \, [\mu m]$$

$D_{EW}$ = thickness of the crystalline layer at the softening temperature in μm $KG_{EW}$ = crystal growth speed at the softening temperature in μm/min R = gas constant = 1.98 cal×mol$^{-1}$×°k.$^{-1}$ $T_{EW}$ = absolute temperature of the softening temperature in °K.

a = heating-up speed of the glass pane during a fire test according to DIN 4102 in °C./min A = activation energy of the crystal growth speed in cal×mol$^{-1}$ With the known high-strength glass objects having crystalline surface layers, the crystalline layers each have a lower heat expansion than the interior of the glass. By contrast herewith, the glass sheets or panes according to the invention can consist of glasses which form crystalline layers with the heating up according to the STC1 such layers having a smaller heat expansion than the glass interior, and also of glasses which form crystalline layers which have a greater heat expansion. The glass panes which consist of glasses which, during the fire test, form a crystalline surface layer which has a lower heat expansion than the basic glass, have an increased mechanical strength after cooling. However, if the crystalline layer is so thick that the internal strength of the glass is exceeded by the tensile stress simultaneously formed in the interior of the glass, the strength can also be reduced.

The heat expansion of the crystalline layer can consequently also be greater than that of the interior of the glass, since in the event of fire, the temperatures at which the crystalline surface layers are formed cannot develop any stresses. It is only after termination of the fire, when the glass panes cool, that the higher heat expansion of the crystal line surface layer can become more noticeable, in that a tensile stress is developed in the crystalline surface layer and the glass panes then crack. In many cases, however, the strength of the glass panes is no longer of any significance at this time.

The upper devitrification limit can either be determined by differential thermoanalysis (DTA) or in a gradient furnace. When using DTA, an exothermic peak is formed with the dissolving of the crystals, which peak indicates the upper devitrification limit. When using a gradient furnace, both the upper devitrification limit and the maximum crystal growth speed can be determined. In this case, small pieces of glass are laid at certain intervals on a sheet of platinum, and the said sheet is brought into the gradient furnace, of which the mean temperature is at the estimated temperature of the upper devitrification limit.

According to one embodiment of the invention, the glass panes can be heated to 50° to 150° C. above the transformation temperature in order to produce the compressive stress in the marginal zone and thereafter left for only such a length of time in this temperature range above the transformation temperature, while the marginal region of the pane is cooled to a temperature below the transformation temperature, that there has still not been formed any surface crystallisation which reduces the mechanical strength of the pane and/or disturbs the transparency of clear glass panes, before the centre of the pane has likewise cooled to below the transformation temperature.

At temperatures of 50° to 150° C. above the transformation temperature, the danger of a deformation is still comparatively slight. The marginal region of the glass pane can thereafter be cooled quickly or slowly to a temperature below the transformation temperature (Tg), while the central region of the pane is maintained at a temperature above the transformation temperature (Tg). It is only after the margin of the pane has cooled to the pre-established temperature below Tg that the complete pane and thus also the central region of the pane is cooled. The marginal region of the glass pane is only cooled so far to a temperature below the transformation temperature that a certain compressive stress is formed in the marginal region with the subsequent cooling of the complete pane.

The compressive stress in the marginal region must of course be sufficiently high for it to be able to compensate for thermal stresses which are set up between the margins and the centre of the pane when the latter is heated up in accordance with the STC1, but on the other hand it must not be too high, since otherwise the mechanical strength of the glass pane would be reduced by more than 80 kp/cm$^2$ by the tensile stress simultaneously being established in the central portion of the pane.

It has been found that the height of the compressive stress which is established in the marginal region of a glass pane of a prescribed size and type of glass depends on how high the glass pane, particularly the central region of the latter, is heated through the transformation temperature and at a maximum up to the softening temperature, how far the marginal region of the pane is then cooled through the transformation temperature down to a maximum of room temperature, and how wide is the marginal region brought under compressive stress.

While glass panes consisting of glasses which do not show a tendency to surface crystallisation can also be kept for a longer time at a temperature above the transformation temperature and up to just below the softening temperature, those glass panes according to the invention which consist of glasses tending to surface crystallisation may only be heated for such a length of time between 50° and 150° C. above the transformation temperature that no surface crystallisation occurs during the tempering, which crystallisation reduces the mechanical strength and, with clear basic glasses, decreases the transparency of the pane.

According to another embodiment, in order to produce a compressive stress in the marginal region and a compressive stress in the surface of the central region of the pane, the said panes can be heated up to a temperature which is within a range of 150° C. below the softening temperature ($E_W$) of the basic glass at a rate fast enough to prevent crystallization and/or deformation, and thereafter the marginal region of the said panes, during a time period in which still no surface crystallisation has been formed, which would lower the mechanical strength of the glass and/or interfere with the transparency of clear glass panes, can be cooled so far to a temperature below the transformation temperature, while the central portion of the pane is kept at a temperature just below the softening temperature, until the marginal region has reached the prescribed temperature, that with the following rapid quenching of the central portion of the pane, a compressive stress is established in the marginal region of the panes and in the surface layer of the central portion of the panes, which stress is only so high that the pane is sufficiently resistive on being heated up in accordance with the STC1.

With thick panes, e.g. 5 to 8 mm, it is desirable for these initially to be left for some time e.g. 5 to 8 minutes, at the transformation temperature, in order then rapidly to heat them to a temperature just below the softening temperature.

The glass panes according to the invention, which have a compressive stress both in the marginal region and in the surface layer of the central portion of the panes, generally show an increased mechanical strength.

Glasses which only show a slight crystal growth speed below the softening temperature and/or with which the nucleus formation in the surface is only initiated with strong delay, can be pre-crystallised with the production of their compressive stress.

For this purpose, the glass panes consisting of glasses showing a weaker surface crystallisation are tempered for about 10 to 60 minutes at a temperature 50° to 150° C. above the transformation temperature, until the nucleus formation has started and a continuous, crystalline surface layer with a thickness of 2 to 5 μm has formed. It is only when this pre-crystallisation is terminated that the marginal zone of the pane and thereafter the central region thereof are cooled.

The pre-crystallisation can also be assisted by applying to the surface of the glass pane a paste which either assists the nucleus formation and/or assists the crystal growth, e.g. by ion exchange, such as a paste with $Li_2SO_4$, lithium aluminate or $TiO_2$.

With the production of a compressive stress in the marginal region and in the surface of the central portion of the pane, the pre-crystallisation can in principle take place just as stated. However, since the glass pane is in any case brought close to the softening temperature, the said pane usually has to be held for only a few minutes longer at this temperature, in order to obtain a crystalline layer which is 2–5 μm thick. It is only when the glass in such circumstances does not form any continuous crystalline surface layer, because it has a poor tendency to nucleus formation, is it necessary either to apply a paste to the pane, which assists the nucleus formation at the softening temperature, or it is necessary for the glass pane, as described in connection with the production of the compressive stress in the marginal region, to be precrystallised at a temperature of 50° to 100° C. above the transformation temperature.

Always when a crystalline layer is produced on the glass pane during the production of a compressive stress on the surface of the pane, it is necessary with clear basic glasses to take care that the transparency is not reduced to more than is permitted to retain full perspicuity. A crystalline surface layer of 2 to 5 μm in most cases only slightly reduces the transparency of a pane.

The fire-proof glass panes according to the invention can also have rounded corners or they can be completely round. As a result of this, their thermal strength is rather increased than reduced. In addition, the invention also includes glass panes which have slight curvature or which are formed into hemispheres, such as those which are used for example for light domes.

The fire-proof glass panes according to the invention can be used for the glazing of buildings in the broadest sense, and also in those cases where there is a danger of a fire breaking out. On of the most important fields of application for fire-proof glass panes must be for glazing windows in high buildings or in partitions. The fire-proof glass panes can be used both as single glazing or also as insulating or multiple glazing in conjunction with float or plate glass.

By the installation of the new fire-proof glass panes, it will be possible in future to prevent a fire spreading from floor to floor over the outside wall.

Also in the parapet region between the two window regions, the fire-proof glass panes can be used both externally and internally. An advantage of the fire-proof panes is that they do not disintegrate or collapse when there is outbreak of fire, so that firemen and other persons cannot be injured. For interior use, the new fire-proof glass panes can be fitted into fire-inhibiting, fire-resistant and highly fire-resistant intermediate walls and partitions since they withstand the fire for at least 90 minutes. The fire-proof panes can be used either as single glazing or as multiple glazing, it generally only being necessary for one of the panes to be a fire-proof pane, in order to prevent fire or smoke passing through. The fire-proof glass panes can in addition be used in combination with heat-insulating layers. Since, with a good heat insulation, the pane which faces the fire has approximately the same temperature as the temperature at the seat of the fire itself, normal glasses are already strongly deformed after 30 minutes. In 30 minutes, according to the STC1, the temperature of the seat of the fire rises to about 825° C., while the softening temperature of most glasses is below this temperature. Because the glass panes according to the invention form a crystalline surface layer when there is a fire, the panes, also with a heat-insulating layer, survive the fire test (STC1) for at least 60 minutes without becoming deformed.

Another possibility of using the fire-proof glass panes is for fire-protection screens.

The standards which are set for glazing in screens of circulation shaft walls are substantially lower as regards the thermal strength than, for example, for fire-inhibiting partitions. Accordingly, the fire-proof glass panes as claimed are likewise equal to these requirements.

The use of the fire-proof glass panes is however not restricted to the direct glazing of buildings. The panes can be used eveywhere where two rooms are separated from one another, when there is a danger of a fire breaking out in one of the rooms. For example, the glazing of ventilation channels can also consist of fire-proof glass panes.

The following examples serve to explain the invention:

EXAMPLE 1

A glass pane (500×500×5 mm), which consists of a glass of the composition: $SiO_2$ 65.80; $Al_2O_3$ 18.00; $Li_2O$ 4.00; $Na_2O$ 2.00; MgO 1.00; ZnO 6.00; CaO 0.50; BaO 1.50; $TiO_2$ 0.60; $ZrO_2$ 0.60, and has the physical properties: heat expansion α (20–300° C.)=50.8×10$^{-7}$

[°C.$^{-1}$], elasticity modulus E=8.9×10$^5$ kp/cm$^2$ Tg (η∼10.$^{13.5}$ poises)=600° C.; position of the DTA peak: 757° C.; upper devitrification limit UDL: 1253° C.; activation energy of the crystal growth speed: 65 kcal/mol, is subjected to compressive stress in the marginal region. For this purpose, the glass pane is placed between two ceramic plates of sillimanite with the size 500×500×50 mm and the composite unit is heated in a chamber furnace to 650° C.

After reaching this temperature, the composite unit is transferred to a second chamber furnace with a temperature of 400° C. The edge of the pane which lies free cools substantially more quickly than central portion of the pane. The speed at which the temperature falls in the centre of the pane depends to a very great extent on the thickness and the material of the ceramic plates. The composite unit will be left in the second chamber furnace until the entire plate has cooled to a temperature of 400° C. and is subsequently cooled to ambient temperature. In this way a compressive stress zone with a width of about 3 cm has been developed in the marginal region of the glass pane. The compressive stress increases from the interior towards the rim of the pane. The compressive stress immediately in the said rim is approximately 450 kp/cm$^2$.

No crystals are to be detected, even with a microscope, on the surface of the pane, which is moreover completely transparent. The reduction in strength of the pane, caused by the compressive stress, amounts to approximately 75 kp/cm$^2$.

The glass pane with the compressive stress in the marginal region is fitted into a steel window frame using a conventional sealing composition. The marginal portion of the pane is covered to about 20 mm by the steel frame. The steel window frame is installed in a brick wall, which serves as the space closure of a firing furnace. The firing chamber is heated up in accordance with the standard temperature curve (STC1) DIN 4102, sheet 2, 1970 Edition. The glass pane goes beyond the first 60 minutes of the firing test without cracking or being substantially deformed. After about 70 minutes, the surface of the glass slowly starts to become cloudy. This clouding increases with the duration of the firing test. The firing test according to DIN 4102 is stopped after 130 minutes. No penetration of fire and smoke can be detected in this instance.

EXAMPLE 2

Several glass panes of the size 500×500×4 mm, which consist of a glass of the composition SiO$_2$ 62.00; Al$_2$O$_3$ 20.00; B$_2$O$_3$ 5.00; Li$_2$O 3.50; Na$_2$O 2.00; MgO 1.00; ZnO 5.00; CaO 1.00; BaO 0.50 and have the physical properties: α (20–300° C.)=48.6×10$^{-7}$ [°C.$^{-1}$]; E=9.1×10$^5$ kp/cm$^2$; Tg=581° C.; DTA peak=765° C.; UDL=1168° C.; activation energy of the crystal growth speed=62 kcal/mol, are successively tempered as follows:

Each individual glass pane is provided with a lithium aluminate paste according to copending application Ser. No. 427,137 and, as described in Example 1, is so positioned between two ceramic plates with a thickness of 3 cm that the margin of the glass pane projects 5 mm on all sides. The composite unit is placed in a furnace and is slowly (about 2° C./min) heated to a temperature above the transformation temperature. After the unit has been tempered for one hour at the required temperature, it is cooled by being transferred into a second furnace, which has a temperaure below the transformation temperature. Since the marginal region of the pane is exposed, it is cooled more quickly than the central region of the pane. It is apparent from the following table how the compressive stress produced in the marginal region depends on the heating up temeprature and the cooling.

| Experiment No. | Heating-up temperature | Cooling | Compressive stress in marginal region | ΔT max | Reduction in strength |
|---|---|---|---|---|---|
| 1 | 1 h 700° C. | 1 h 200° C. | 900 kp/cm$^2$ | 320° C. | 160 kp/cm$^2$ |
| 2 | 1 h 700° C. | 1 h 300° C. | 650 kp/cm$^2$ | 260° C. | 120 kp/cm$^2$ |
| 3 | 1 h 700° c. | 1 h 400° C. | 450 kp/cm$^2$ | 220° C. | 80 kp/cm$^2$ |
| 4 | 1 h 700° C. | 1 h 500° C. | 220 kp/cm$^2$ | 165° C. | 40 kp/cm$^2$ |

The stronger the cooling of the rim, the higher is the compressive stress in the marginal region of the pane. Due to the compressive stresses produced in the marginal region, the panes, on being heated up, withstand a temperature difference (ΔT$_{max}$) of 165°–320° C., depending on compressive stress. Simultaneously with the compressive stress, a closed crystalline surface layer with a thickness of about 2 to 5 μm is formed in the surface of the central portion of the pane, but the said surface layer does not spoil the transparency of the pane.

The firing test for these panes is carried out as described in Example 1. The pane of experiment No. 4 is cracked with the heating during the fire test, while the remaining panes withstand the heating process. After 70 minutes, the surface of these panes starts slowly to become cloudy. The fire test according to DIN 4102 (FIG. 1 STC1) is stopped after 130 minutes; no passage of fire and smoke is detected in this case.

EXAMPLE 3

A glass pane (500×500×6 mm), which consists of a glass of the composition: SiO$_2$ 64.00; Al$_2$O$_3$ 15.00; P$_2$O$_5$ 2.00; Li$_2$O 3.00; Na$_2$O 4.00; MgO 1.00; ZnO 2.00; CaO 5.00; BaO 4.00 and which has the physical properties α (20–300° C.=52.8×10$^{-7}$(°C.$^{-1}$); E=8.8×10$^5$ kp/cm$^2$; Tg=550° C.; DTA peak: 744° C.; UDL=1078° C.; activation energy of the crystal growth speed 64 kcal/mol, is placed under compressive stress in both the marginal region and in the surface layer of the central region of the pane. For this purpose, it is compressed between two ceramic plates, which can be heated. The rim of the glass pane projects 5 mm beyond the ceramic plates on all sides. Placed around the projecting rim of the pane is a hollow metal frame, which can be cooled with water and also with air. The glass pane between the ceramic plates is heated at a rate of 2°–10° C. 1/min to 700° C. After reaching this temperature, the rim of the pane is cooled to 200° C., while the central region of the pane is still kept at 700° C. For cooling the rim of the pane, air is introduced through the metal frame. When the rim of the pane has reached 200° C., the two ceramic plates are removed from the central portion of the pane, and the pane which is in the steel frame is moved between an air spray, such as that conventionally used for hardening glass panes. After the hardening, the glass pane has a crystalline surface layer with a thickness of about 2 μm in the central portion thereof, but this layer does not interfere with the transparency of the pane. The mechanical strength of the pane is somewhat higher than the basic strength of the untreated pane.

For the fire test, similar to that described in Example 1, the pane is fitted with a steel frame as a space closure into a firing furnace. The compressive stress produced in the marginal region is sufficient to compensate for the heat stress being set up on heating up the firing furnace. As in Examples 1 and 2, the crystals, also with this pane, extend from the surface further into the interior of the glass and as a consequence impart to the glass pane a sufficient stability, so that no passage of flames or smoke could be detected during the fire test (150 minutes).

In the examples, the glass panes used as starting materials can be prepared by any known conventional procedure for making such glass panes.

The disclosure in copending application Ser. No. 505,895 with respect to glasses including properties, test procedures, etc. applies herein.

Glass compositions capable of surface crystallisation are for example described in copending application Ser. No. 427,137. Same preferred compositions well suited for the purposes of the invention have been described in Examples 1–3 above.

Figure 2:
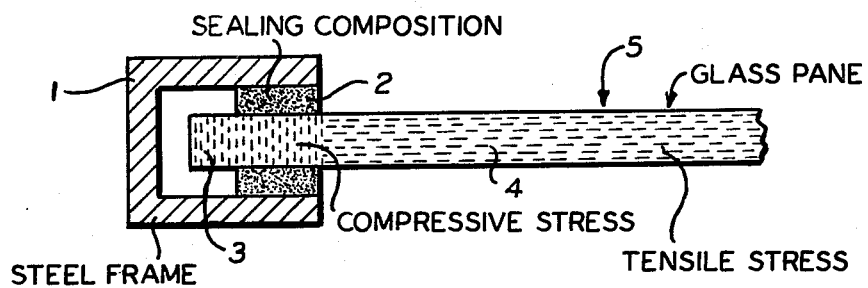
FIG. 2 and FIG. 3 depict windowpanes according to the invention, mounted in frames.
Figure 3:
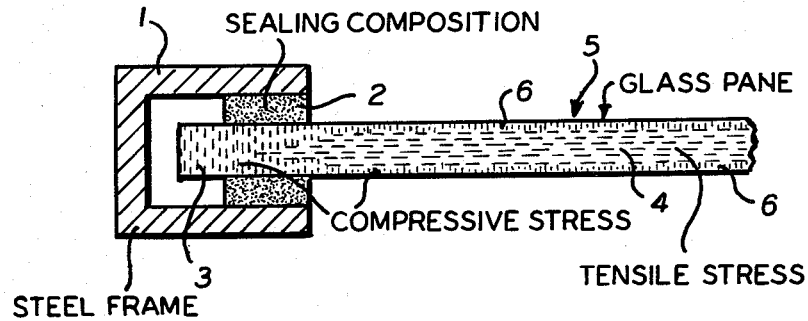

Referring to FIG. 2, glass pane 5 is mounted in steel frame 1 by sealing composition 2. The peripheral portion 3 of the glass pane 5, which is gripped by the frame 1 is compressively prestressed, while the portion of the pane inwardly of said prestressed area is tentionally prestressed. In FIG. 3, the construction is the same, except that the surface portion of the pane inwardly of the prestressed peripheral portion is compressively prestressed.

Figure 1:
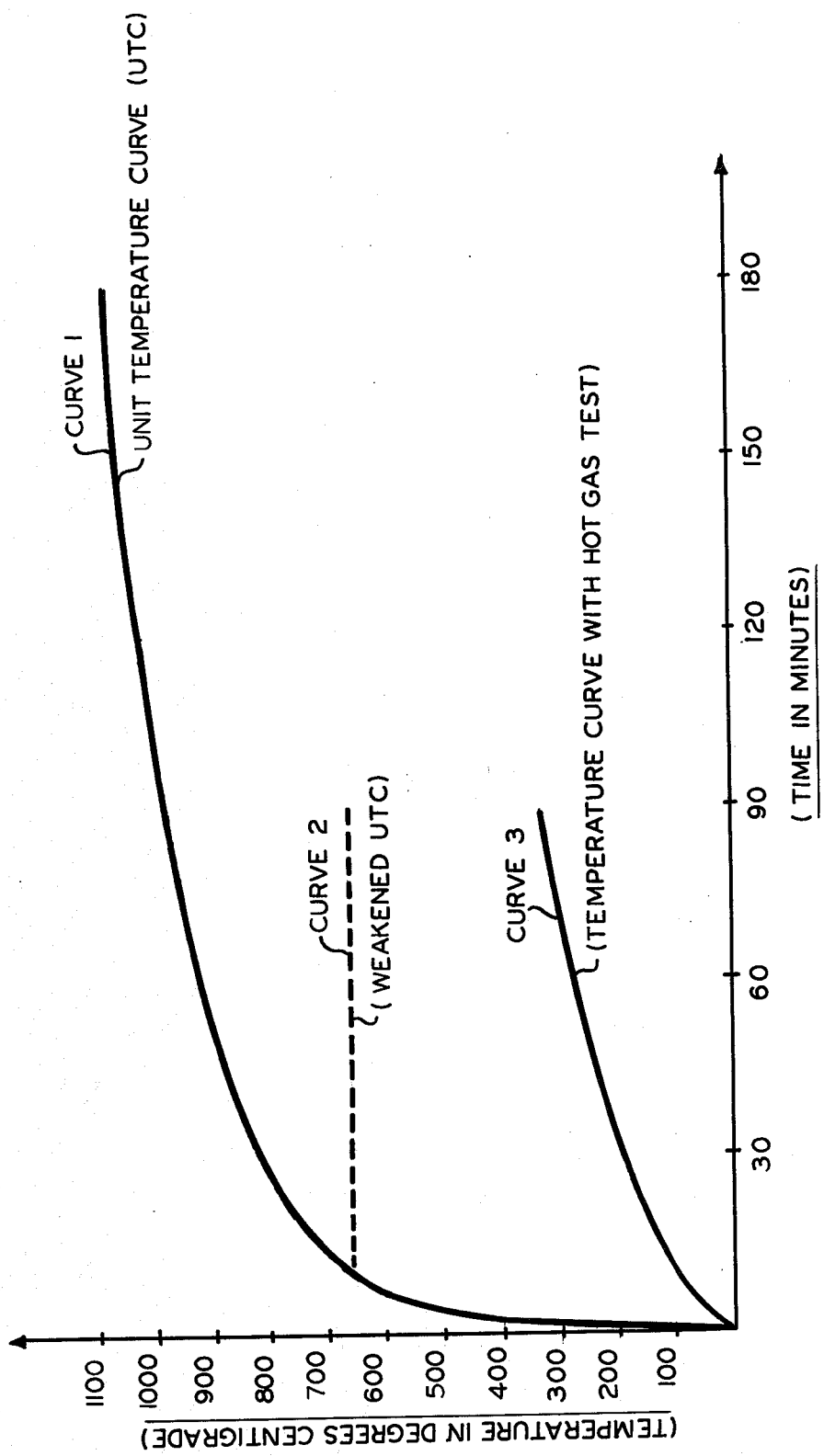
FIG. 1 is a plot of temperature against time in minutes for the heating according to procedures of the said DIN 4102, including the standard Temperature Curves (STC1) of said standard.

I claim:

1. In a fireproof glass pane which is resistant to high temperature and suitable for use as glazing in a room or space closure, the improvement wherein the pane withstands a fire test according to DIN 4102, (1970), STC1 (FIG. 1), for at least 90 minutes, the pane having a compressive stress in the marginal region, the product of heat expansion ($\alpha$) and elasticity modulus (E) of the glass is 1–5 kp×cm$^{-}$×°C., and the pane is capable of surface crystallization such that, when it is heated up in accordance with said DIN 4102 to just below the softening temperature of the basic glass, a continuous crystalline surface layer with a thickness of at least 5 μm, forms.

2. Glass pane according to claim 1 having an upper devitrification limit of more than 800° C.

3. Glass pane according to claim 1 having a compressive stress in the surface layer of the centre of the pane.

4. Glass panes according to claim 1 having a continuous, crystalline surface which is a 1–5 μm thick, which does not impair its clearness.

5. Glass pane according to claim 1 rounded at the corners.

6. Glass pane according to claim 1 wherein the pane is round.

7. Glass pane according to claim 1 wherein the pane is bowed.

8. Building having a closure defined at least in part by a glass pane according to claim 1, mounted in a frame therefore.

* * * * *

UNITED STATES PATENT AND TRADEMARK OFFICE
CERTIFICATE OF CORRECTION

PATENT NO. : 4,172,921
DATED : October 30, 1979
INVENTOR(S) : Werner Kiefer

It is certified that error appears in the above-identified patent and that said Letters Patent are hereby corrected as shown below:

Col. 12, line 18 (Claim 1, line 13)

Change "$Cm-X\ °C$" to -- $Cm^{-2}X\ °C^{-1}$ --.

Col. 12, line 39 (Claim 9, line 2)

Change "therefore" to -- therefor --.

Signed and Sealed this

Twenty-ninth Day of April 1980

[SEAL]

Attest:

SIDNEY A. DIAMOND

Attesting Officer

Commissioner of Patents and Trademarks